(12) United States Patent  
Abercrombie et al.

(10) Patent No.: US 7,773,773 B2  
(45) Date of Patent: Aug. 10, 2010

(54) METHOD AND SYSTEM FOR DETERMINING A VOLUME OF AN OBJECT FROM TWO-DIMENSIONAL IMAGES

(75) Inventors: Robert K. Abercrombie, Knoxville, TN (US); Bob G. Schlicher, Portsmouth, NH (US)

(73) Assignee: UT-Battelle, LLC, Oak Ridge, TN (US)

( * ) Notice: Subject to any disclaimer, the term of this patent is extended or adjusted under 35 U.S.C. 154(b) by 881 days.

(21) Appl. No.: 11/583,473

(22) Filed: Oct. 18, 2006

(65) Prior Publication Data

US 2008/0095404 A1 Apr. 24, 2008

(51) Int. Cl.
  G06K 9/36 (2006.01)
  G06K 9/46 (2006.01)
(52) U.S. Cl. ........................ 382/104; 382/286
(58) Field of Classification Search ............. 382/104, 382/286
  See application file for complete search history.

(56) References Cited

U.S. PATENT DOCUMENTS

| | | | |
|---|---|---|---|
| 6,310,987 B1 * | 10/2001 | Koyama | 382/307 |
| 6,373,579 B1 | 4/2002 | Ober et al. | |
| 6,879,702 B1 | 4/2005 | Fisher et al. | |
| 6,909,514 B2 | 6/2005 | Nayebi | |
| 2003/0137646 A1 | 7/2003 | Hoffman et al. | |
| 2004/0066500 A1 | 4/2004 | Gokturk et al. | |
| 2004/0240754 A1 * | 12/2004 | Smith et al. | 382/286 |
| 2006/0222263 A1 * | 10/2006 | Carlson | 382/287 |

FOREIGN PATENT DOCUMENTS

| | | |
|---|---|---|
| EP | 0 674 759 B1 | 7/2001 |
| JP | 61176808 A * | 8/1986 |
| JP | 01145509 A * | 6/1989 |
| JP | 07320189 A * | 12/1995 |
| WO | WO 98/18117 | 4/1998 |

OTHER PUBLICATIONS

"2003 General Motors LSSV Military Truck Owner Manual Supplement", 2003, pp. i-8-3, and two pages of table of contents.*
English Abstract of JP07320189A, 2 pages.*
English Abstract of JP61176808A, 2 pages.*
English Abstract of JP01145509A, 2 pages.*

* cited by examiner

Primary Examiner—Brian P Werner
(74) Attorney, Agent, or Firm—Boyle Fredrickson, S.C.

(57) ABSTRACT

The invention provides a method and a computer program stored in a tangible medium for automatically determining a volume of three-dimensional objects represented in two-dimensional images, by acquiring at two least two-dimensional digitized images, by analyzing the two-dimensional images to identify reference points and geometric patterns, by determining distances between the reference points and the component objects utilizing reference data provided for the three-dimensional object, and by calculating a volume for the three-dimensional object.

34 Claims, 12 Drawing Sheets

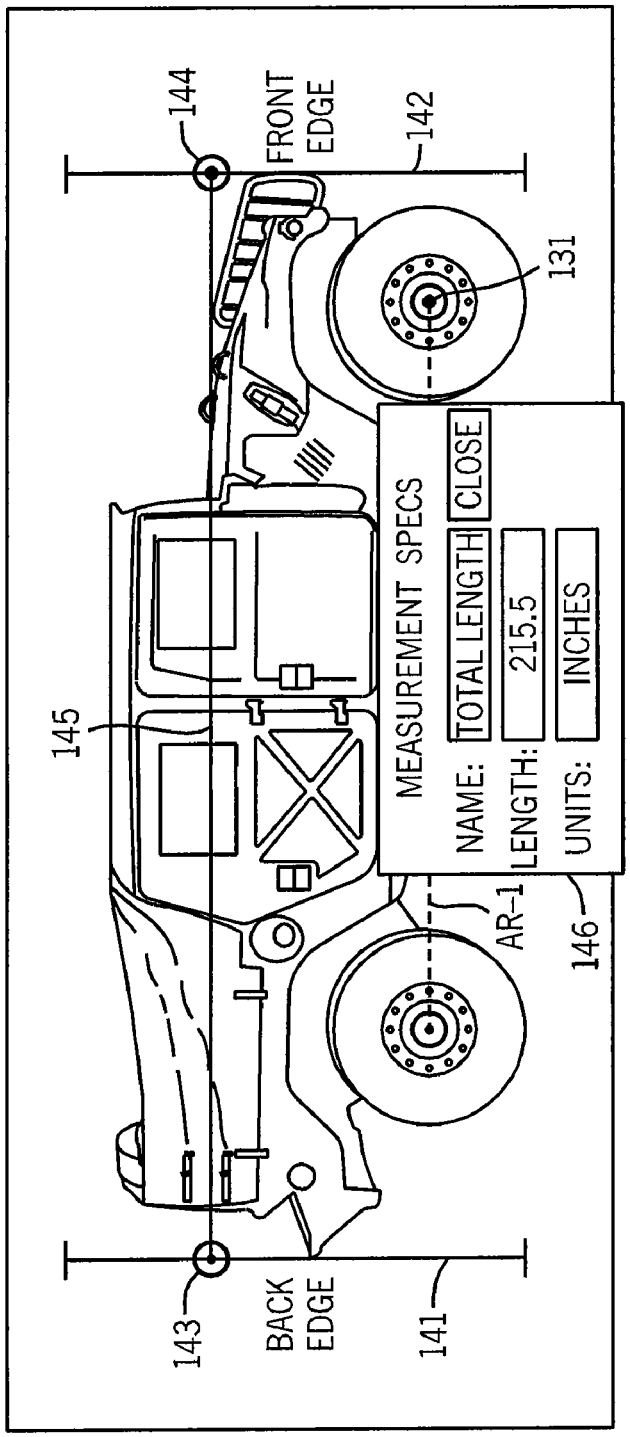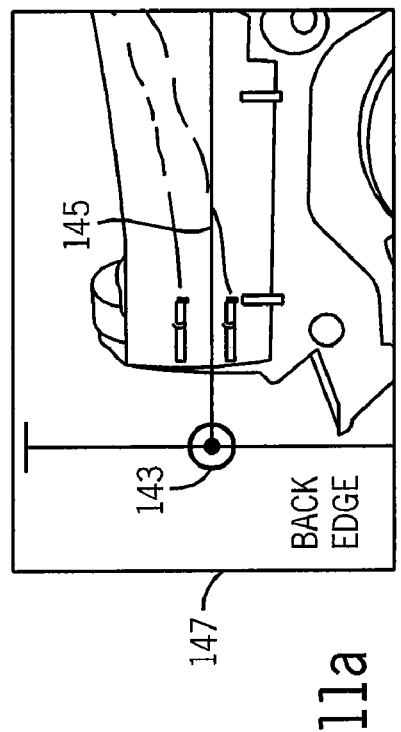
FIG. 11
FIG. 11a

US 7,773,773 B2

METHOD AND SYSTEM FOR DETERMINING A VOLUME OF AN OBJECT FROM TWO-DIMENSIONAL IMAGES

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The current invention relates to a method and system for determining a three-dimensional size of a large object from two-dimensional images.

BACKGROUND OF THE INVENTION

Many systems exist today for receiving two-dimensional images for various further processing. There is not known, however, a method and system for utilizing such images for quickly and automatically calculating the volume of a large object such as a vehicle. Such a method and system has value in the transportation of a plurality of large objects in estimating total load size. Although there exist systems for computing load sizes from volume measurements which are provided as input data, there has not been a method and system for rapidly and automatically determining volume data for a plurality of large objects that may vary in volume depending on model and accessories.

With respect to vehicles, there has been known a method for detecting the shape and location of wheels for purposes of wheel alignment as disclosed in EP 0 674 759. There has also been known in the machine vision technology, a method for optical detection of edges of a relatively small object on an assembly line. U.S. Pat. No. 6,909,514 discloses a vision system for inspection of railroad wheels. U.S. Pat. No. 6,879,709 discloses the machine vision detection of faces within digital pictures and video. U.S. Pat. No. 3,069,654 discloses the detection of shapes from arbitrary images using the Generalized Hough Transform.

None of these systems contemplate the need and solution for automatically measuring relatively large objects, larger than a person, and objects the vary depending on model and attachments.

SUMMARY OF THE INVENTION

The invention provides a method for the determining a volume of three-dimensional objects represented in two-dimensional images, the method comprising: acquiring at least two two-dimensional images; analyzing the two-dimensional images to identify reference points and component objects; and determining distances between the reference points and utilizing reference data provided for the three-dimensional object; and calculating a volume for the three-dimensional object based on the distances between the reference points and the identity of the three-dimensional object.

The method of the invention has an automatic mode in which dimensions are automatically calculated from the images and a manual mode in which reference points are entered by the user for determining dimensions that are then used to calculate the volume of the object.

The invention also provides a computer program for receiving two images of a three-dimensional object, and determining a volume for the three-dimensional object, the computer program comprising an image acquisition group of instructions for receiving at least two images of the three-dimensional object in a digital format; a feature detector group of instructions that detects features of the three-dimensional object in the image; a reference detector group of instructions that organizes the features, reference positions and shapes in the image; a display group of instructions for displaying the images on a visual display; and a measurement calculator group of instructions that determines measurements about the three-dimensional object in the image, including a volume for the three-dimensional object.

It is a further particular aspect of the invention, that the three-dimensional object is a wheeled vehicle, which is larger than a person, and may be larger than conventional passenger vehicles. It is advantageous to be able to measure this object by imaging due to its large size.

In a further aspect of the invention, the computer program may further include an adaptive learning group of instructions that determines the quality of results from executing the feature detector group of instructions, a reference detector group of instructions and the measurement calculator group of instructions that are executed a number of times until a statistical degree of certainty is reached as to the identity of the object, in this case the vehicle.

The resulting two-dimensional images and reference points and objects, as well as dimension lines and values, can be displayed on a computer screen for viewing, editing and saving the edited images for further review and processing.

The two-dimensional images can be acquired from any source including a digital camera, a scanned image, a pre-existing digital image, an infrared image or an image converted from another file.

The images can be stored in any available format, such as but not limited to JPEG, PNG and bit-mapped.

The method also provides for automatic detection of shapes within the image such as but not limited to circles, squares, rectangles and ellipses corresponding to parts of the object.

The measurements for the three-dimensional object are calculated by using two digital images, one from a side-view and the other from a front or back view. A common reference measurement is located in both views to relate the views to one another. As an example, if the length of the object is found in the first view, a width is found in a second view and a height measurement can be a common reference used to relate the first view to the second or depth view.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

BRIEF DESCRIPTION OF THE DRAWINGS

FIG. 11 is a screen display showing a side view in elevation of the vehicle in FIG. 1 and a selection of a vehicle length dimension and a resulting display of the selected dimension;

FIG. 11a is a detail showing ability to zoom in on a selection point in FIG. 11.

DETAILED DESCRIPTION OF THE PREFERRED EMBODIMENTS

Figure 1:
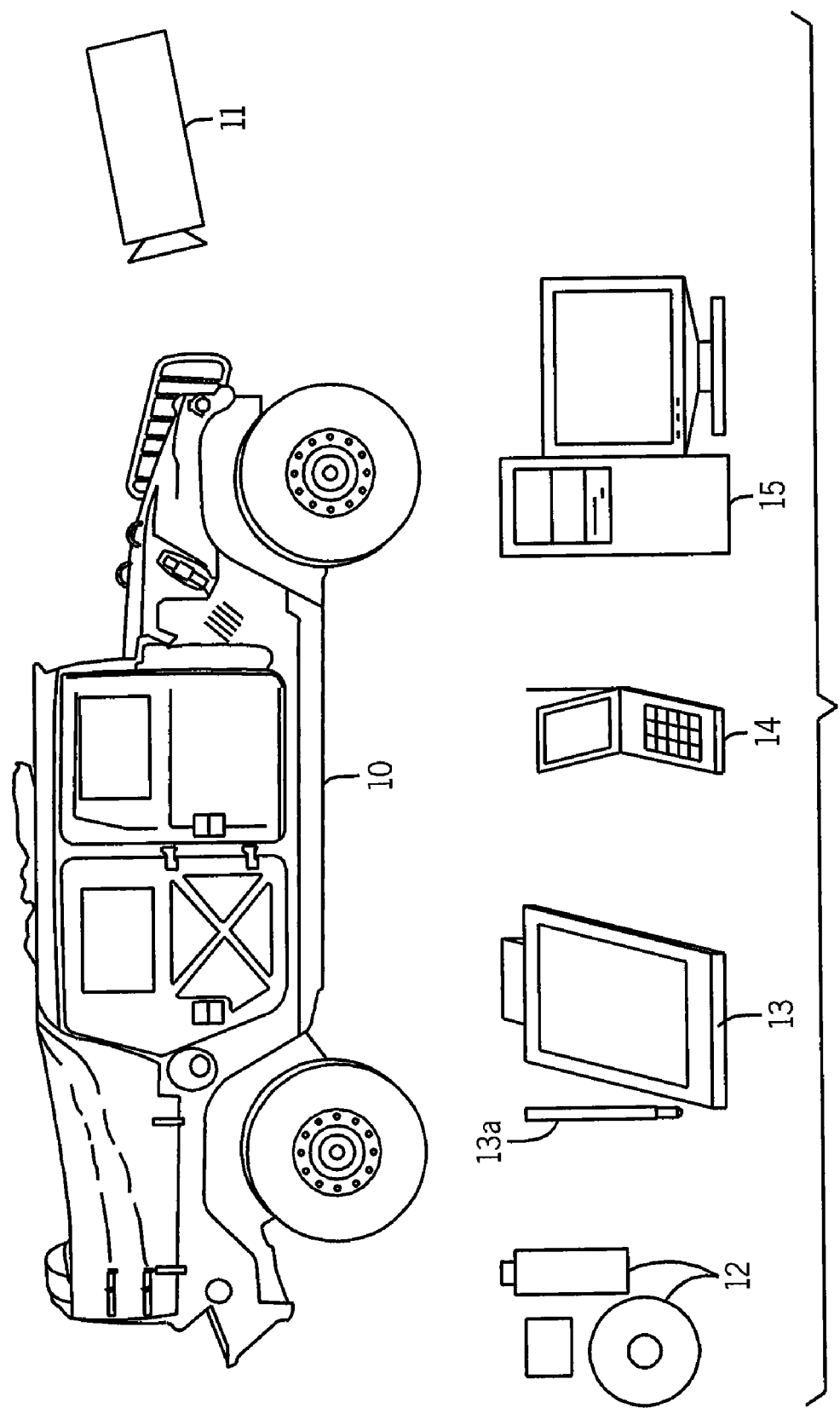
FIG. 1 is a side view in elevation of a wheeled vehicle with devices for acquiring digital images.
Figure 2:
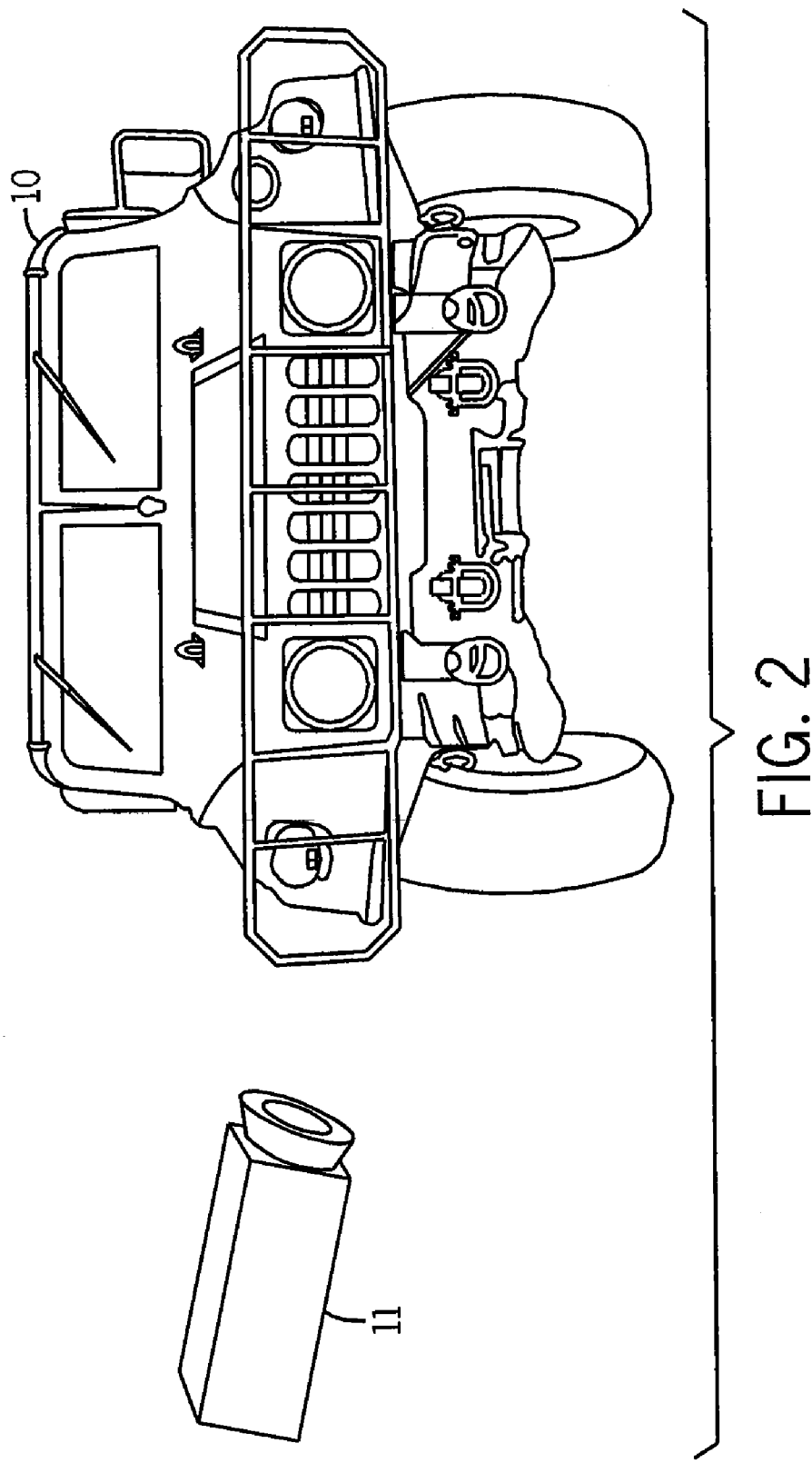
FIG. 2 is a front view in elevation of the wheeled vehicle in FIG. 1.

FIGS. 1 and 2 show an object to be measured for volume, such as a wheeled vehicle 10. A camera 11 is used to acquire an end view image from the front 104 or back 100 of the vehicle 10 and is also positioned on the side to acquire a side view image. The camera 11 can be any camera or camera system, analog or digital, which results in outputting a digital image(s) that can be captured in visible or non-visible spectrum, including infrared, or any other radiated illumination that produces an image containing discernable objects. The camera system can store the digital image(s) in memory media that can be processed by the computer program to be described herein. The digital image can alternately be transferred and then read and processed by the same computer program on an alternate computer unit.

The image acquisition system includes, if required in the case of an analog camera, a capability for digitizing the image that converts each image frame into a set or organized pixels in any digital format including but not limited to JPEG, PNG, and bitmap. The camera 11 can include an on-board processor that can host the program, and can be part of a PDA 13, smart phone 14 or can be a computer peripheral device (not shown). The PDA may be touch screen enabled that allows a stylus 13a or any rigid instrument to tap on the screen to make selections, type and execute actions in the PDA 13, smart phone 14 or an alternate computer peripheral device (not shown).

The camera system 11, 13, 14 can include wireless data communications that facilitates transmission of digital images and related data to a receiver that is part of a system that provides the images and data to a computer 15, which is preferably a running a Windows XP operation system and the computer program for performing the method of the present invention. This configuration can also include the image and measurement processing performed on the camera device with the results transmitted via the wireless communications.

Figure 3:
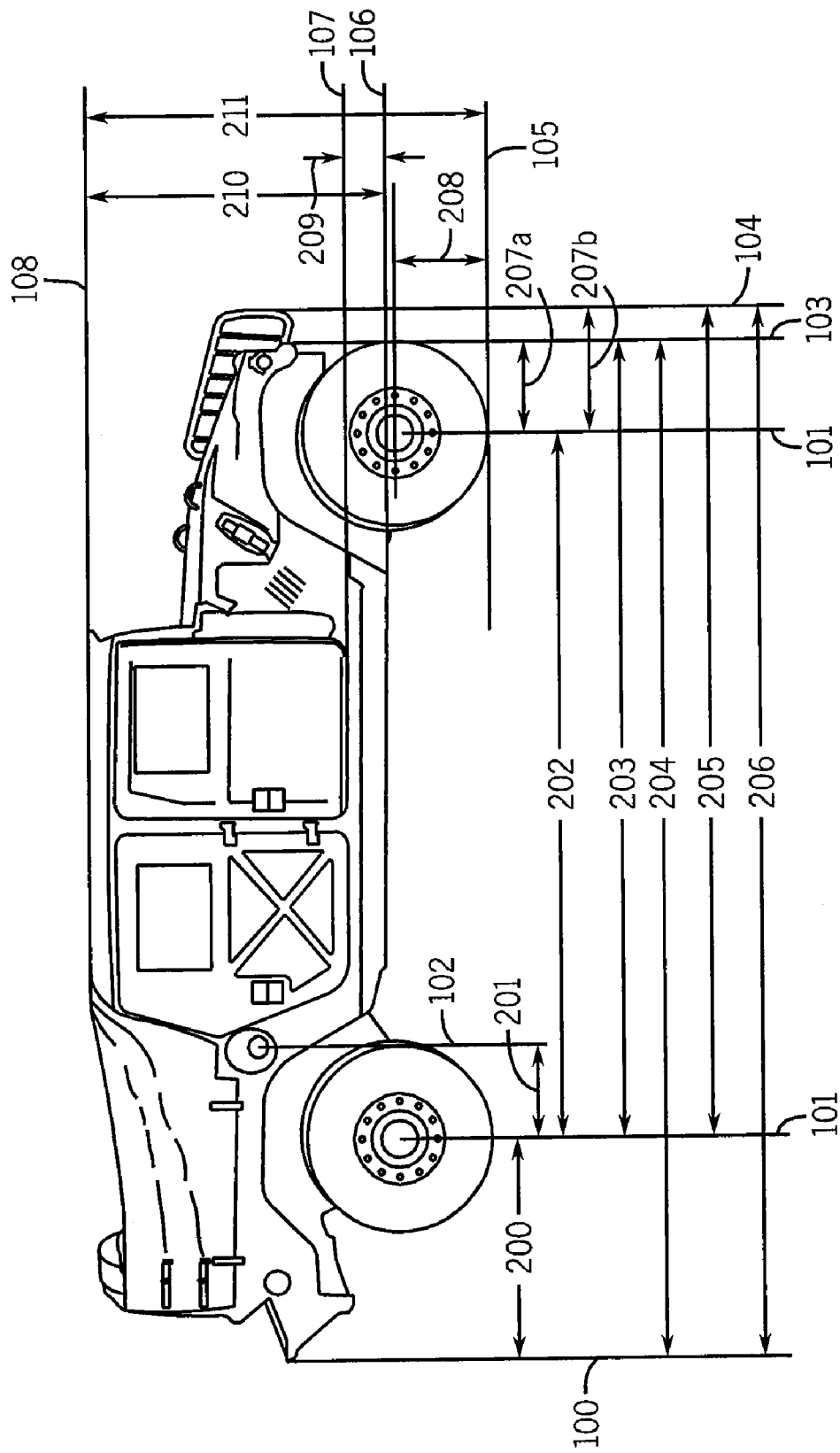
FIG. 3 is a screen display showing a side view in elevation of the vehicle in FIG. 1 indicating relevant features as measurement reference points and lines.

FIG. 3 shows an image of a wheeled vehicle 10 with vehicle reference point and lines, such as a vehicle back boundary 100, a vehicle axle position 101, a vehicle gas cap center position 102, a vehicle front boundary 103, a vehicle front boundary 104 including attachments, a vehicle bottom or ground level 105, a vehicle chassis bottom 106, a vehicle door bottom 107 and a vehicle top boundary 108.

The following list includes dimensions for which measurements are developed either automatically, or are manually input into the computer 15 for calculation. These include the distance from the rear edge of the vehicle to the back axle 200, the distance from the rear wheel axle to the gas cap center 201, the distance between the front axle and the rear axle 202, the length to the rear axle from the front of the vehicle without attachments 203, the distance from the front bumper to the rear edge 204, the distance from a front boundary (with attachment) to the rear axle 205, a vehicle length including attachments 206, a distance from a front bumper, to the front axle 207a and a distance from an attachment to the front axle 207b, a wheel radius from an axle 208, a distance from a vehicle bottom to the bottom of the door 209, a distance from a bottom of the vehicle to the vehicle top boundary 210 and an overall vehicle height above the ground 211.

The fixed length reference values from the front and side views can be stored in a memory and can be retrieved by the computer program and used to assist with automatically detecting features and determining the outer bounds of the vehicle—height and length.

Figure 4:
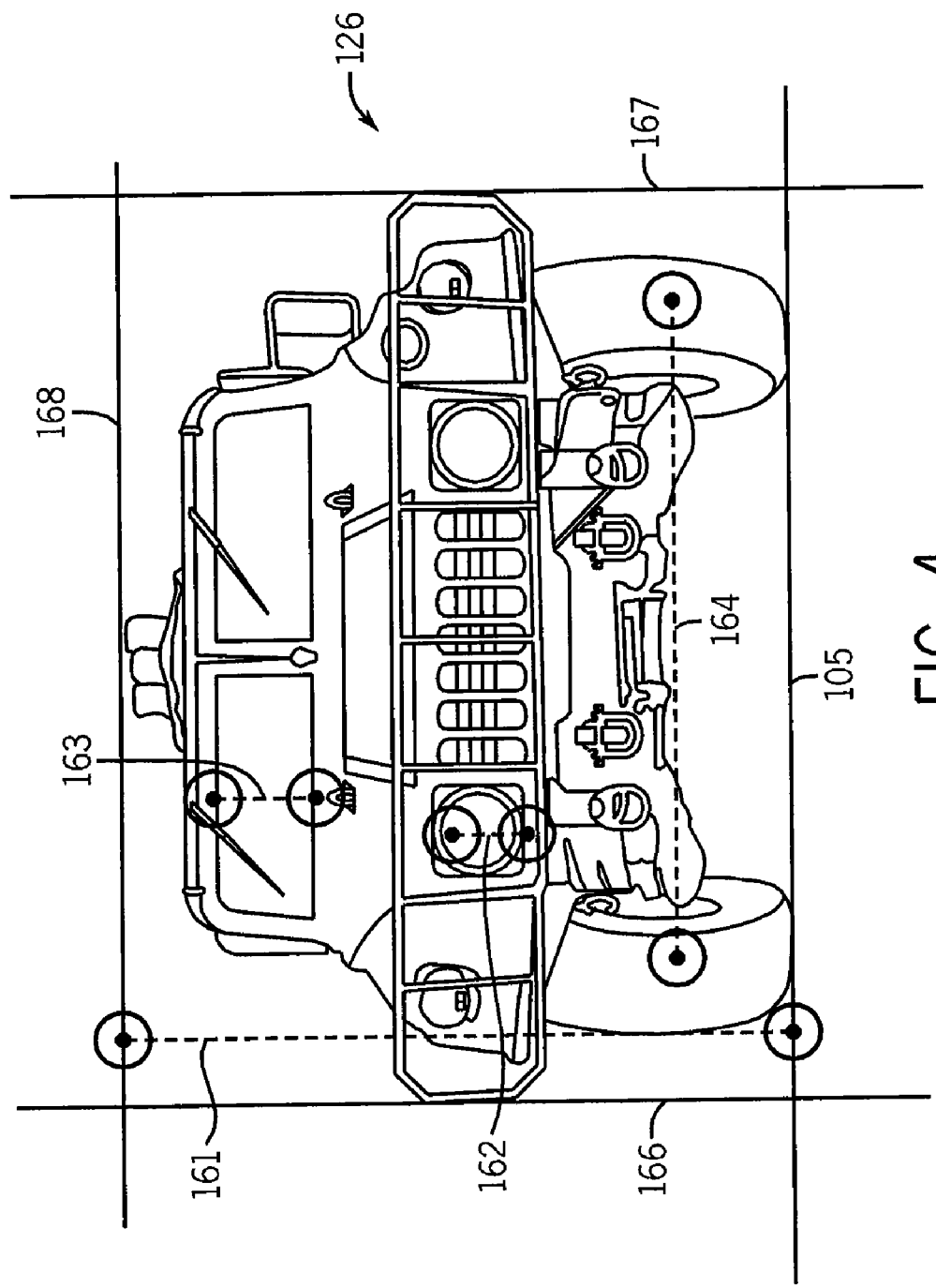
FIG. 4 is a screen display showing a front view in elevation of the vehicle in FIG. 1 illustrating reference points and features.

Similarly, FIG. 4 shows a front view of the vehicle 10 with reference boundaries such as ground 105, right-side and left-side vehicle boundaries 166, 167 (relative to a driver) and a vehicle top boundary 168 and a ground level 105. A transverse distance between wheels is represented by dimension line 164. A vehicle height dimension is represented by dimension line 161. A headlight diameter is represented by dimension 162 and a windshield height is represented by dimension line 163. These are only meant to be exemplary, and other dimensions and reference points will be apparent to the reader.

The fixed length reference values from the front view can be stored in a memory and can be retrieved by the computer program and used to assist with automatically detecting features and determining the outer bounds of the vehicle—height and width.

Figure 5:
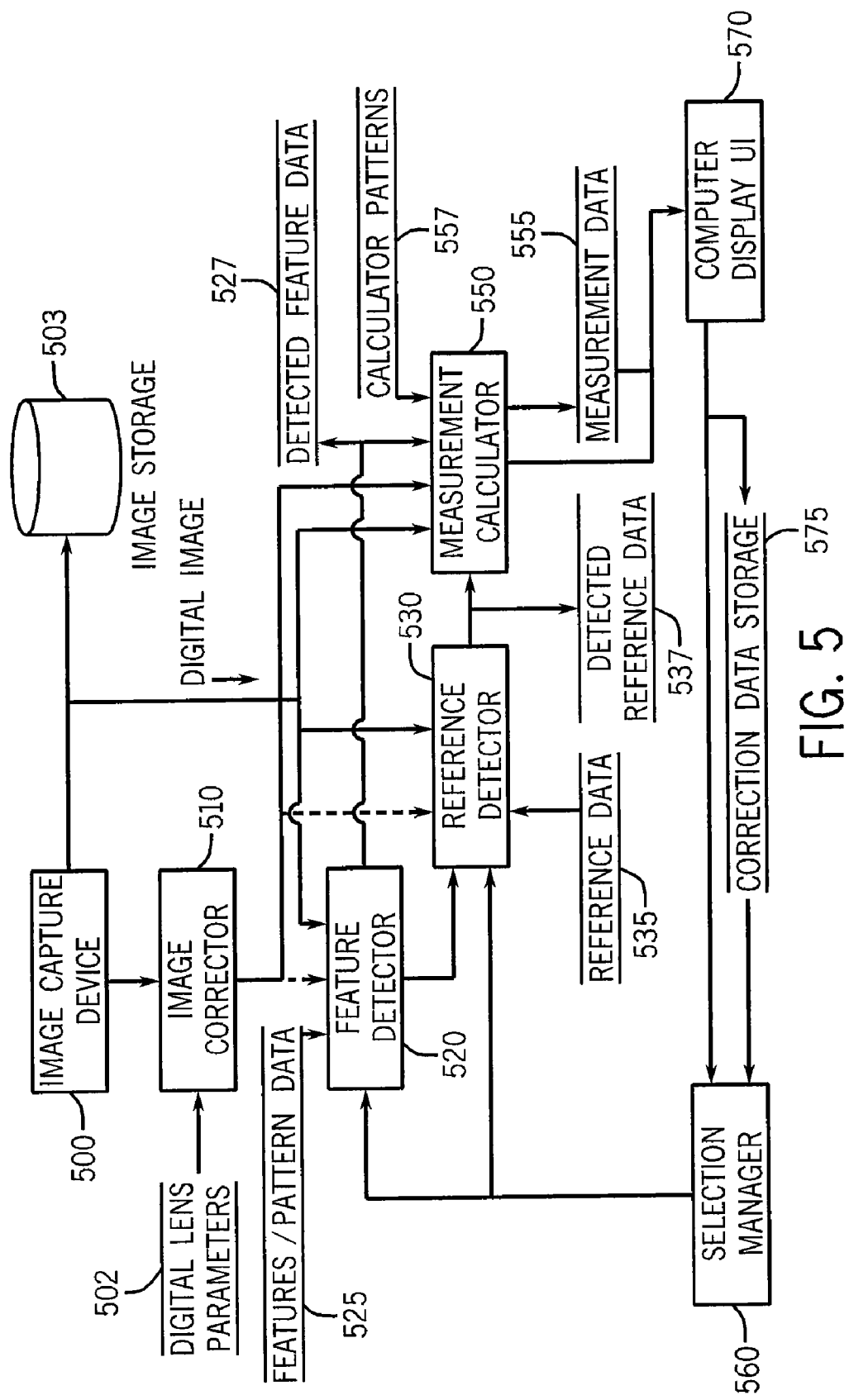
FIG. 5 is a block diagram/flow chart showing the sequence of operations of the method and computer program of the present invention.

FIG. 5 is a block and flow diagram of the novel vehicle detection and measurement system including the computer program of the present invention. The Image Acquisition group of instructions 500 includes instructions for receiving, if required in the case of an analog camera, a digitized image in any digital format including but not limited to JPEG, PNG, and bitmap. The digital image is next operated on by the Image Corrector group of instructions 510 that is a specialized program module that receives the image data and is capable of correcting two types of image distortion caused by different types of cameras, and known as barrel distortion and pincushion distortion. In alternative embodiments, this function might be performed by hardware logic. The image corrector 510 can alter the image using various techniques and algorithms, as described further herein and elsewhere, which produces a new image that has certain pixel positions adjusted such that the view of the distortion has effectively been removed.

The image corrector group of instructions 510 operates on data from the digital lens parameters source 502 to perform the image correction. The values stored in this digital lens parameters source 502 are organized by and associated with a camera type or model. In this manner, the values from the data store are specifically retrieved and applied for the type of camera that captured the image to the distortion correction algorithms.

Stored digital lens parameters 502 are derived for a digital image that is disposed on a Cartesian grid captured at different focal distances to the grid. Digital lens parameters 502 can also be derived from a digital image of a measurement scale captured at different focal distances to the scale. The stored digital lens parameters can also be derived from a mathematical representation of the lens distortion or from lens distortion correction algorithms. The image can also be corrected for pixel aspect ratio distortion and perspective distortion in the digital image.

An image corrector group of instructions 510 creates and modifies an image correction layer 610 represented in FIG. 6. This layer 610 is created as a separate array or matrix of values that stores the quantity of correction for each corresponding pixel of the image. The image itself is not altered. The layer can be created using different techniques including prior art distortion correction techniques and a novel approach of this invention that uses an equation that uniformly applies an approximation of the distortion from the focus center of the image to the edge of the image boundary in two planes. The approximation is based on the distortion characteristics of the camera.

Figure 6A:
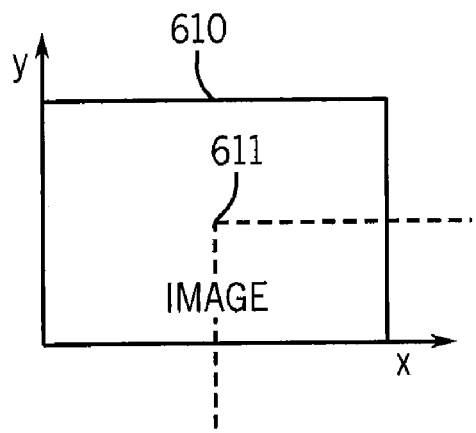
FIGS. 6a-6f are detail views showing the operation of an image corrector element in FIG. 5.
Figure 6B:
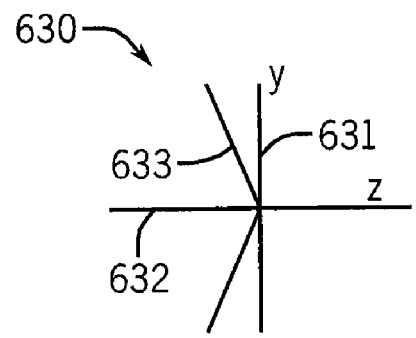
Figure 6C:
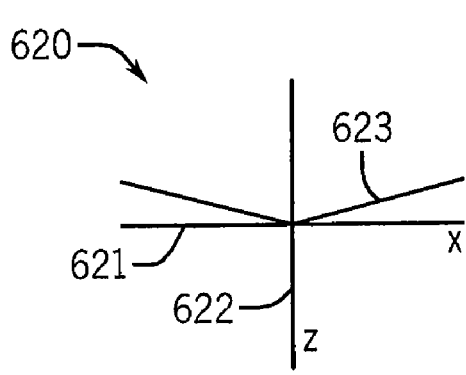
Figure 6D:
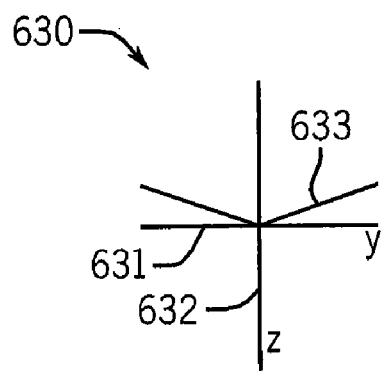

FIGS. 6a-6f provides a model of the approximation on a three dimensional Cartesian coordinate system. In FIGS. 6b-6d, the x-z plane 620 and the y-z plane 630 are presented with an x-axis 621 and a y-axis 631 representing the spatial position in pixels on the image that is the distance from the center of the focus set at a center point 611 where x=0, y=0. The measurements relative to the z-axis 622, 632 in FIGS. 6c and 6d provide the amount of distortion as a displacement measured in the number of pixels. The quantity at a pixel position indicates the amount of correction to apply at that pixel. In general, for most commercial consumer cameras and wide-angle lens cameras, the further away from the center of focus 611 on the image, the greater the distortion or displacement of pixels.

Figure 6E:
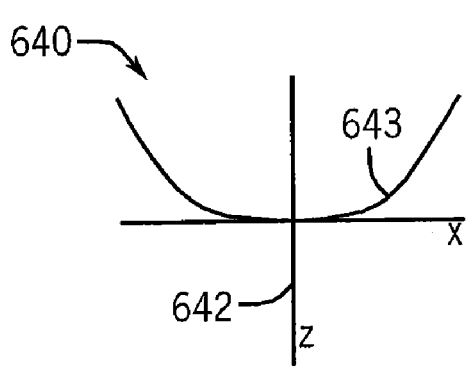
Figure 6F:
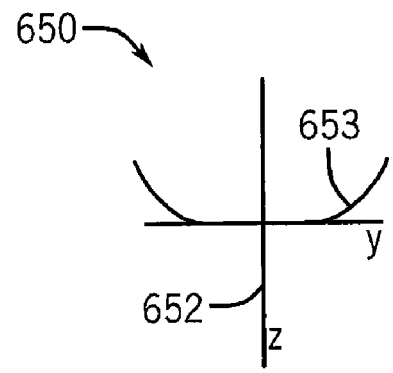

FIGS. 6e and 6f illustrate other functions for representing the distortion graphs 643, 653 to indicate that any function can be applied to the approximation. With the image correction group of instructions 510, the computer program can look up the pixel position as an x, y coordinate and obtain the amount of correction to apply to its position.

The image corrector group of instructions 510 can utilize two tables, corresponding directly to the plane of pixel positions of the image, wherein each value of the table provides an index of a pixel position in the image and a corresponding value that is a displacement of the same pixel; and wherein the value calculated using any function that originates in the center focus of the image and changes with a parameterized function radially from the said center to the edges in a manner defined by the function.

The image corrector group of instructions 510 can also utilize two tables, wherein one of the two tables represents the pixel position correction for one dimension of the image and the other of the two tables represents the pixel position correction for the other dimension.

The image corrector group of instructions 510 can also utilize two tables, wherein each table is indexed by x values for pixel position with respect to the coordinate system, and wherein the corresponding y values are the amount of correction for the pixel position.

These methods are all used to correct positions for reference and measurement symbols that are located on the image.

Referring again to FIG. 5, after the image(s) is processed through the image corrector group of instructions 510, the image(s) is processed for identifying features and reference items through execution of a feature detector group of instructions 520 and a reference detector group of instructions 530. The features and pattern data are stored in a features/pattern data store 525 for comparison with features derived from the images. Examples of features are wheels, wheel wells, axle positions, and a vehicle bottom shape. The method and program detect geometric patterns for a wheeled vehicle such as ellipses for the wheels, hub, and hub cap, and the remaining body of the vehicle can be specified with rectangles, triangles, and combinations of other geometric shapes.

Automatic detection of ellipses including circles is determined by the following procedure:

1. Convert the image to an edge enhanced image by performing an edge description operation such as Sobel, Canny, or Robert Cross edge detectors. The output of the operation is a set of pixels that comprise edges and boundaries of objects in the image. These operators detected edges by processing the gradients of the image.

2. Perform the Hough Transform on the image to identify regular geometric forms such as lines, circles, and ellipses in the entire image. This transformation will produce candidate shapes in the Hough Transform space. A list of these shapes, called the detected shape list, is obtained by mapping the Hough Transform results to the Cartesian space of the image.

3. If no circles or ellipses are detected, then apply other established ellipse detection techniques including circle detection algorithms. Some of these algorithms involve the repetitive evaluation of the relationship between two pixels of the image as part of the detection process. Such a relationship involves a line between two or more pixels. The number of such evaluations is reduced by eliminating those pixel pairs whose line intersects with a line discovered earlier in step 2 above. Any shape findings are added to the list.

The overall method for measuring volumes of objects has three modes including a manual mode, a semi-automatic mode, and an automatic volume determination mode for identifying features, references, and measurements. In the manual process, the user performs selections using a computer display user interface 570 with the image displayed on the screen to indicate the features and the characteristics of those features of the vehicle. Events involving the image originating from the user are processed through the selection manager group of instructions 560, which are further processed by the feature and reference detectors 520, 530.

In a semi-automatic mode, the feature and reference detectors 520, 530 assist the user with selecting features by performing and displaying an edge detection for the image using prior art techniques, performing detection of basic features including the wheels and edges of the vehicles, and assisting selections made by the user by providing a scaled, zoomed-in view of the area of interest enabling the user to perform more refined selections and by providing automatic selection movement to within a pixel width of that selection. This assistance is used primarily to selecting an edge, for example the top edge of a vehicle, whereby the width of the selection (made with a mouse or stylus) is thicker than a pixel and the selection made by the user is not exactly at the edge.

In the automatic mode, the computer program identifies a vehicle beginning by detecting the wheels in a side-view image combined with using any available data about the vehicle, and proceeds to identify the vehicle bottom edges, top edges, additional features, and the front and back edges.

The general detectable features for a side-view vehicle image used by this invention include the wheels, the bottom vehicle edge between wheels, door handles, lights, the position of wheels with respect to each other, the pattern or shape of the vehicle body, window size and shape, gas tank intake or panel, door outline or panels, wheel fender well and relative positions of the hood, wheels, bumpers, and windows. The program stores the discovered and identified features, references and their data, whether performed manually or automatically, in the detected feature data 527 and detected reference data 537 represented in FIG. 5.

After at least one reference value is established for the vehicle image, a measurement can be identified, either manually or through automatic detection, and the same measurement is automatically determined through the measurement calculator group of program instructions 550. As more references are added or a reference is edited that may involve a change in the length, the measurement calculator 550 correspondingly recalculates the measurements. The calculations involve adjusting the pixel positions for the start and end pixel locations of the references and measurements using the image correction layer 610. The image correction layer 610 contains positive and negative values.

A reference length is corrected by the image correction group of instructions 510 as follows:

Using $ref_{corr}$ as the corrected reference length and $(x1, y1)$, $(x2, y2)$ as the two end points of the reference line identified as pixel positions, obtain the corrected points by lookup from the Image Correction Layer defined as:

$$(x1c, y1c), (x2c, y2c) \quad (1)$$

The corrected reference length is then calculated as:

$$ref_{corr} = sqrt((x2c-x1c)^2 + (y2c-y1c)^2) \quad (2)$$

where "sqrt" is the square root operator.

The calculations are performed for each measurement by applying the following formula:

$$m_{corr} = (ref_{corr}/ref_{pix}) \times m_{image} \quad (3)$$

where:

$m_{corr}$ is the measurement length to calculate, $m_{pix}$ is the length in pixel count, $ref_{corr}$ is a reference (designated as 1) length of known or assigned quantity, $ref_{pix}$ is the corresponding reference length in pixel count, and $ref_{corr}/ref_{pix}$ is called a reference ratio.

Considering that more than one reference length that may have been included with the image, the length is calculated as follows:

$$m_{corr} = ref_{ave} \times m_{pix} \quad (4)$$

where:

$ref_{ave}$ is the average of all the reference ratios associated with the image where the average is the sum of the reference ratios divided by the number used in the sum.

In the cases involving more than one reference measurement, the image correction group of instructions 510 may use a subset of the reference ratios to determine $ref_{ave}$. Depending on the location of the length to measure, the image correction group of instructions 510 may automatically include nearby reference ratios to this location that are chosen based on proximity and their size in length. This technique is used to reduce errors in the measurement calculations that are attributed to distortions in the image that may originally be introduced by the camera lens and may not be fully compensated for through distortion correction.

The measurement calculator group of instructions 550 calculates depth or width of a three-dimensional object by using a minimum of two digital images of the same material object from one view and the other from a depth or width view of the first image. The common measurement is shared between the two images so that if the values are known in one image, the measurement values in the second image are automatically known. As an example, if one image that captures the length view and the other image that captures the width (depth view), then the height can be determined and used as the common measurement to link the data from the two images.

After the measurement calculator group of instructions 550 produces its results, it stores it in the measurement data storage locations 555 and informs the user of the updates through the computer display user interface 570. The computer display user interface 570 can display the results or provide an indicator to the user about updates from the measurement calculator 550.

The computer program enables the user to control and override detections and values determined by the program through interaction with the computer display user interface 570 that transfers such user requests to a selection manager group of instructions 560. The user can select any measurement or reference symbol, or can position and resize that selected part or move that selected part to a new location on the vehicle image. The program will automatically perform new measurements based on any changes that may warrant such calculations.

The user can change the position, size, and value(s) of the reference data by selecting the symbol(s) and/or obtaining a dialog box to edit the data associated with the data. The computer display user interface 570 interacts with the selection manager group of program instructions 560 that tracks the user's actions and uses the feature detector 520 and reference detector portion 530 of the program to indicate the overrides, changes, or new data. These portions of the program 520, 530 perform the changes or additions, update their corresponding data stores, and trigger the measurement calculator 550 to update its measurement values. The measurement calculator 550 performs its calculations as described elsewhere herein, updates its data store, and informs the user of any changes.

The computer program facilitates the user to export or extract some or all of the settings and values in the program into a persistent form as a data and/or text file in a tabular, free-form format or structured format. This persistent form can include or refer to the images and can be bundled for digital transmission on the Internet through wired and wireless communications. The saved program data is saved in such a manner that the saved data can be retrieved and read in by the program at a separate time and separate program execution and exactly display and present the values as it was when it was saved.

The manual data input process involves the user interacting with the computer program by selecting points on vehicle images, identifying reference and measurement symbols, setting values, and obtaining measurement results. The manual process is performed by the user to provide data to the operations of the feature detector 520 and reference detector 530 groups of program instructions, with these data input operations being automated in the automated version of the method.

Figure 7:
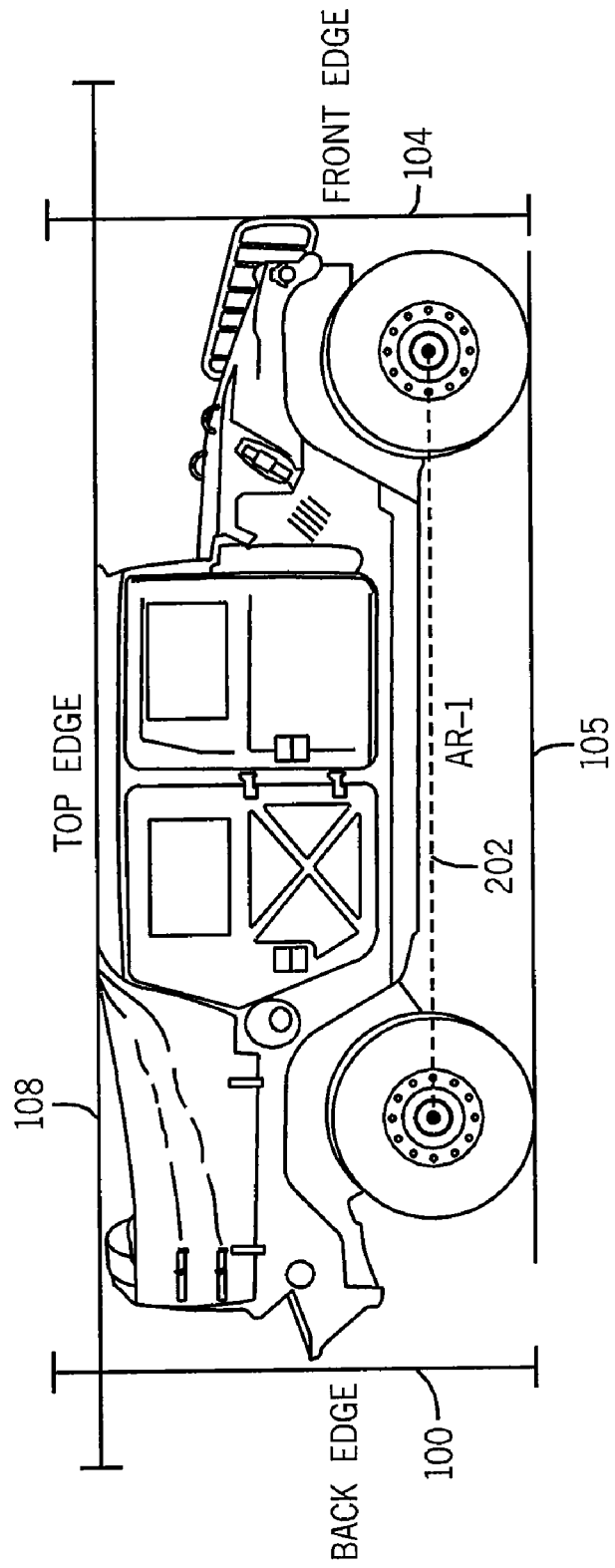
FIG. 7 is a screen display showing a side view in elevation of the vehicle in FIG. 1 illustrating user selected reference points and lines.

The user selects a position of the vehicle image on the screen that is correspondingly displayed on the screen as a selection as a symbol, line, or some overlay display on the image to indicate a selection. FIG. 7 illustrates a computer screen display in which the selection of boundaries or edges 100, 104, 105 by the user and a line 202 whose purpose is as a guide to adjust reference, edges, and measurements. The symbol for a reference line 202 as shown in FIG. 7 is a dotted line terminated on each end by a circle with a dot in the center. This invention is not limited to the symbols used in FIG. 3 or any other figures provided. An edge is a line with a name that may be significant to the user. In FIG. 7, the line guide 105 could be identified as the bottom edge.

Figure 8:
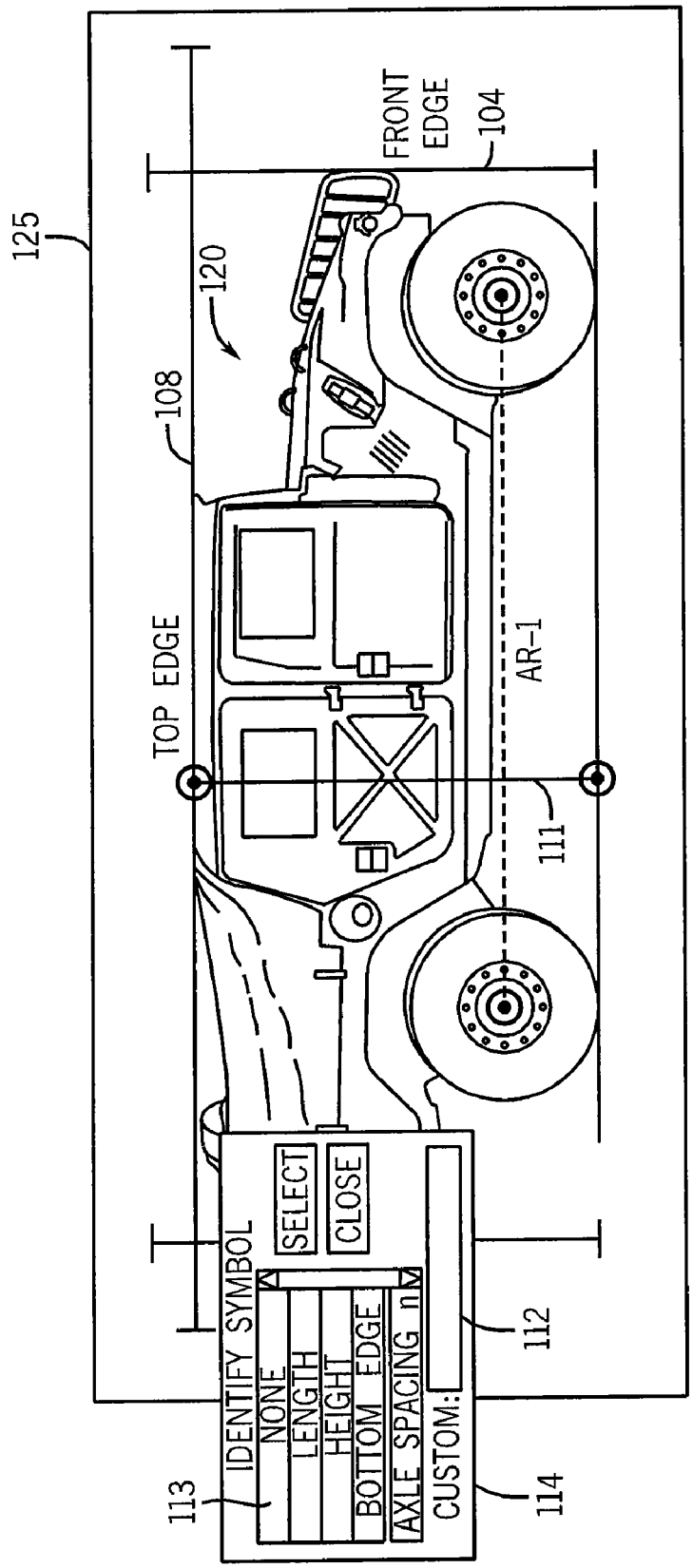
FIG. 8 is a screen display showing a side view in elevation of the vehicle in FIG. 1 illustrating a selection and identification of symbols for various dimensions on the vehicle.

As seen in FIG. 8, the user is asked to name symbols in connection with certain dimensions such as length, height, and axle spacing. The top edge 108 would be identified with a height dimension 111. A dialog box 114 is presented to allow the user to select a symbol 113 from a list or enter a custom label in the "Custom" box 112.

Figure 9:
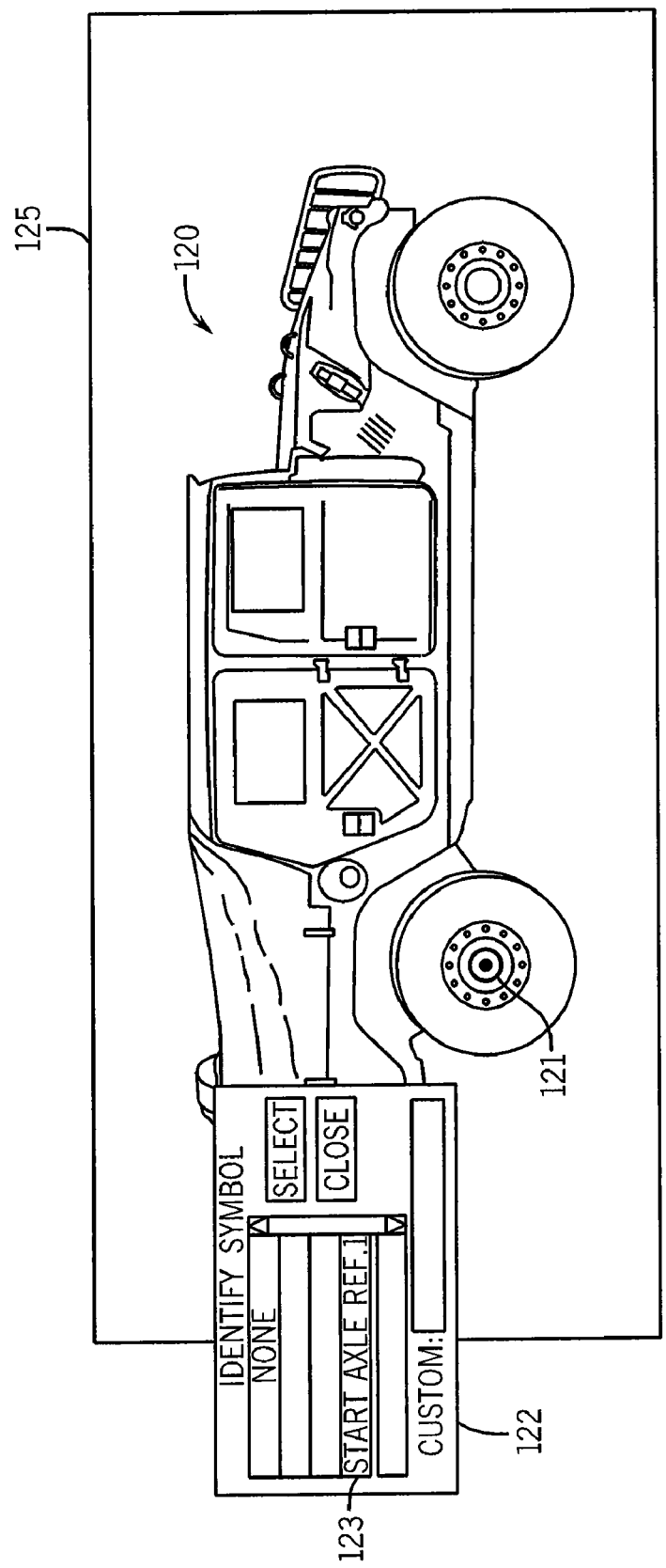
FIG. 9 is a screen display showing a side view in elevation of the vehicle in FIG. 1 and illustrating a dialog/data entry box for entry of data to identify a start symbol.

As seen in FIG. 9, it is assumed that the axle spacing has been selected, and the user is prompted by the computer program to identify the name of a position or characteristic that has just been selected or the symbol just drawn 121. The prompt is illustrated as an overlay dialog box 122 but could also be a separate window. The user can adopt a selection name 123 provided by the program, such as "Start Axle Ref. 1" or may enter a custom name. If the user chooses a selection that is not custom, then depending on the selection, the computer program may prompt the user to perform another selection or to enter more data.

The user can proceed to use the computer program in the following manual manner. The exact order of selecting positions or characteristics and performing actions described as follows is not required. This process assumes that the computer program has already obtained a digital image(s) 120 containing a vehicle, the program is displaying it on the computer screen 125, and the user can interact with the program through the hardware and software user interface of the computer.

At any time during the execution of the program, the user can select to set parameters describing the vehicle in the image including but not limited to the vehicle make and model, vehicle orientation—side view facing left/right, front, back, and reference position data such as the length of a distance between two axles.

A reference data database or data store 535, as seen in FIG. 5, can store data that can be used for performing the measurements that include but are not limited to vehicle make and model, distance between axles, specifications for length, width, and height, size of vehicle windows, vehicle shapes, vehicle component shapes, and other reference lengths on the vehicle that may include the distance from an axle position to a vehicle boundary or edge.

Figure 10:
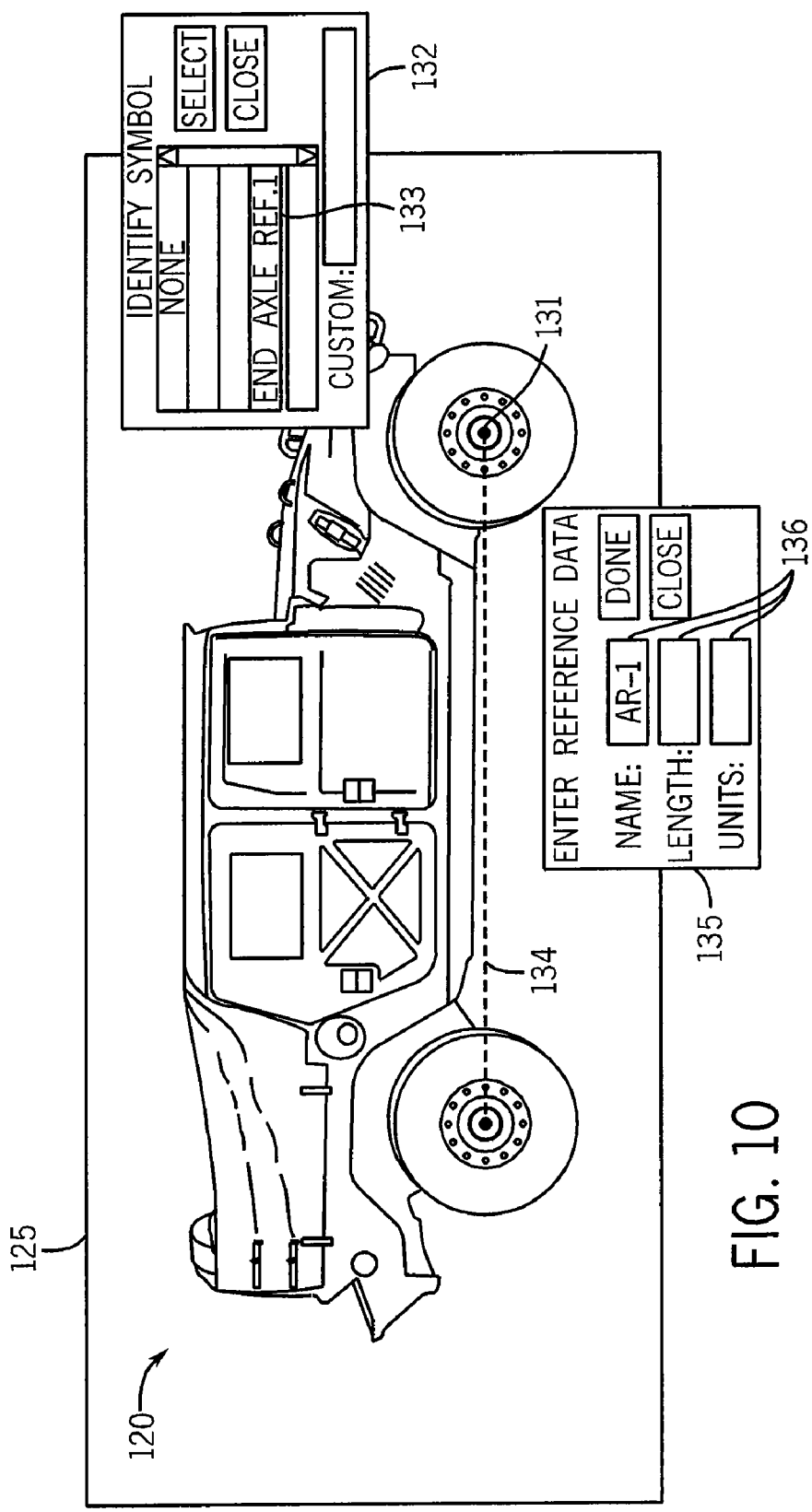
FIG. 10 is a screen display showing a side view in elevation of the vehicle in FIG. 1 and illustrating an end symbol and a dialog/data entry box for entry of reference data to be related to the end symbol.

Typically, a reference begins with a "Start" point that has a corresponding end point that will form a connection between the two points. This part of the sequence is illustrated in FIG. 10. The computer program prompts the user to select this end point. The user selects another point on the image as shown in FIG. 10—at a front wheel axle 131. The computer program identifies the second point as the "End Axle Reference 1" 133 in an overlay dialog box 132 or separate screen and displays a symbol at the point and may automatically connect and display a line from the start to the end point 134.

As seen in FIG. 11, the computer program may prompt the user 146 to provide a name, value, and unit of measure of this reference distance through a dialog box 136. In this process flow, the axle distance has been chosen as a reference measure, since this is typically a known and fixed quantity about a vehicle.

The user provides the quantity and the units and indicates to the program to associate the values with the reference symbol AR-1.

At this part in the process flow, the user has completed the identification and entry of a reference measurement position. Based on one or more reference entries, measurements can be entered or automatically calculated pertaining to features about the vehicle.

The following process shown in FIG. 11 is a part of the manual process that realizes the capabilities of the feature detector 520 and reference detector 530 for locating dimensions. The process described next assumes that the user has already placed the two edges, front and back, as shown in as 141, 142. The user selects another position 143 on the vehicle image with the intention to obtain a measure of the overall length of the vehicle. The computer program draws a symbol on the image at the location of the selected position 143. The user can zoom into an area and increase the size of the image for that zoom area to achieve better selection accuracy 147 as shown in FIG. 11a with the start selection 143. The computer program prompts the user to identify the selected point. The user selects to indicate that the point is the "Start Total Length" 143. The computer program may change the symbol to indicate that the "Total Length" has been chosen. The computer program may prompt the user to select the end point for the Total Length. The user selects a point on the image. The computer program identifies the second point as the "End Total Length" 144 and connected by a line 145. If at least one reference has been established, then the computer program automatically calculates this measurement as described earlier and can display the results to the user in display box 146.

Figure 12:
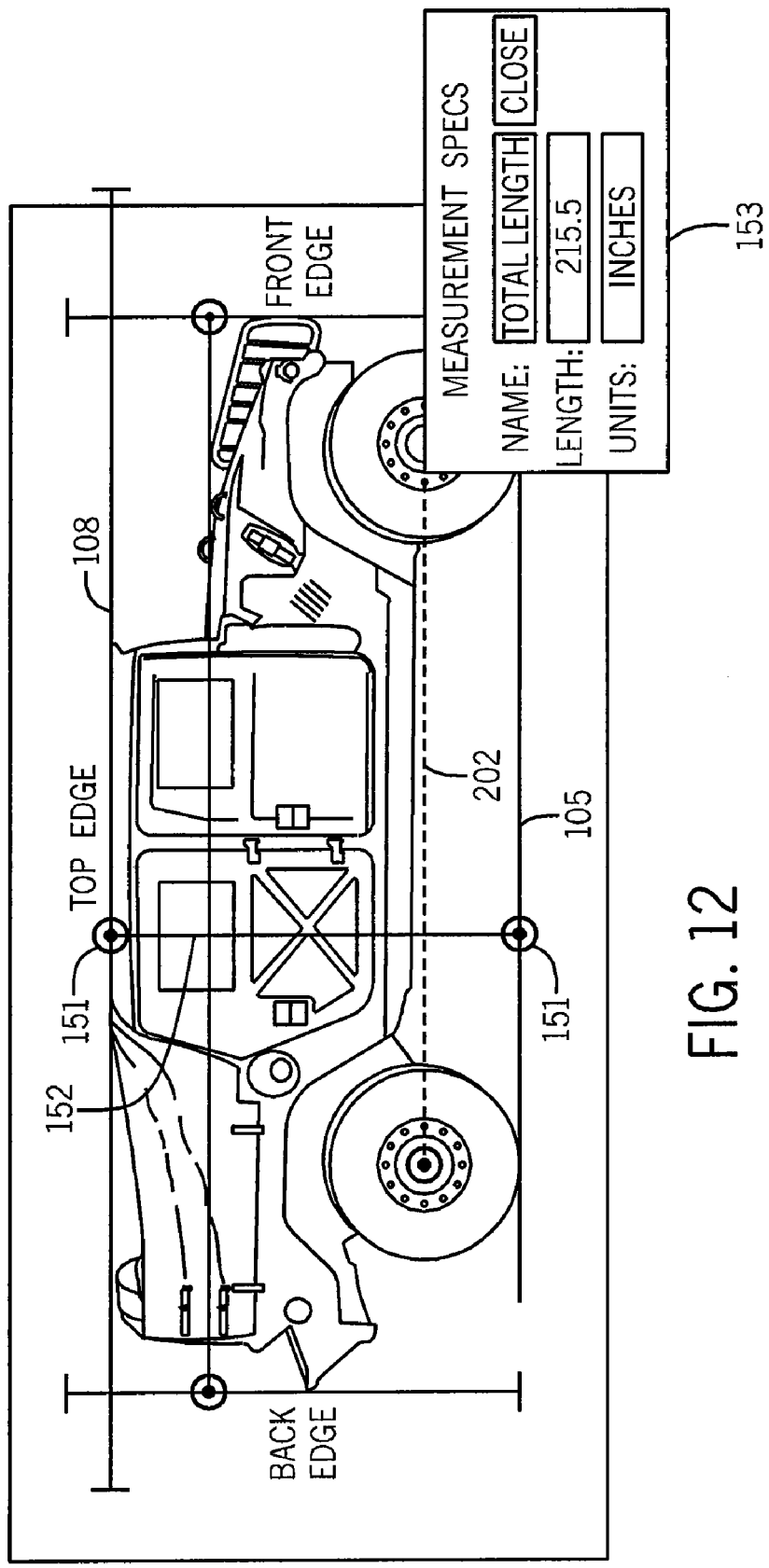
FIG. 12 is a screen display showing a side view in elevation of the vehicle in FIG. 1 and a selection of a vehicle height dimension and a vehicle length dimension and a resulting display of the selected dimension.

Next, the height of vehicle 10 is determined as shown in FIG. 12. The user selects to measure the height of the vehicle using the same vehicle image. As shown in FIG. 12, the computer program displays the ends of the measure 151 and connecting line 152, prompts the user in the same manner as described earlier and determines the value of the height 153 that has been selected using the same formulas. In FIG. 12, the user has previously set the bottom of the vehicle with the guide line 105 and identified the top edge 108 of the vehicle 10 prior to measuring the height. The user can continue to perform these same operations for setting other reference positions and measurements.

To perform measurements of the front or back of the vehicle, the user selects and uses a different vehicle image 126 of the front or back view of the vehicle as shown in FIG. 4. Several reference measurements include but are not limited to the axle width, the height of the vehicle, window size(s), and bumper size(s).

At a minimum, the vehicle height measured from the side view 120 can be used as a reference in the front and back views. While viewing the front or back view of the vehicle, the user selects a first position on the image and indicates the "Start Reference 1" for this point. The computer program performs its operations as described earlier for setting reference measurements. The user completes the reference measurement by selecting "End Reference 1" and provides the data for the length of the reference.

To measure the width of the vehicle, the user selects a start position and indicates it as "Start Width". The user can choose any position to begin the width that may include but is not limited to a tire, door, bumper, or mirror. The computer program performs its operations as described earlier for measurements. The user completes the measurement by selecting another position as the end point of the width measurement. The computer program identifies the second point as the "End Width". The computer program automatically calculates this measurement by one of several of the formula identified earlier.

The reference measurements, calculated measurements, symbol positions, symbols and the images are saved to a permanent or persistent memory and can be retrieved and displayed in the computer program exactly as it was saved.

The automatic mode involves the computer program executing several of the parts of the process in FIG. 5 with the capability for the user to control the process.

The automatic mode executed by the computer program proceeds in the following manner. The order of the automation for identifying vehicle shapes, positions, and characteristics and performing actions described as follows is not required. This automatic process assumes that the computer program has already obtained at least two digital image(s) 120, 126 of a vehicle, and the program is displaying one of the images on the computer screen 125, and the user can interact with the program through the user interface 570.

The user may provide several initial reference data parameters including but not limited to the make and model of the vehicle, the axle count, and the orientation.

The reference data database 535 stores and organize data that can be used for performing the measurements that include but are not limited to vehicle make and model, number of axles, distance between axles, specifications for length, width, and height, size of windows, vehicle shape parameters and characteristics.

The two-dimensional digital image may be converted by known filtering techniques to identify or enhance the edges in the image. The method and computer program performs edge detection using one or many Gradient Operators, including but not limited to Sobel, Roberts, and Isotropic operators, that can be plugged in through the extension mechanism, in such a manner that a new image is created with highlighted edges and transparent otherwise and overlaid on the original image for enhanced viewing. The user is provided with the option to turn on and off the edge overlay.

The computer program is executed to scan the side view of the vehicle image or filtered image, locates and identifies the wheels using pattern detection techniques as described above for ellipse and circle shape detection in an image.

The computer program is executed to normalize the vehicle image skew to an axis that passes through the axle positions or center of each wheel that have been detected. This is called the vehicle axis.

The Automatic Detection of a Wheeled Vehicle in the side-view image is as follows in two modes of operations: a) vehicle shape data is not available and b) vehicle shape data is available in the repository or database. Where vehicle shape data is not available, process can begin with any arbitrary wheel and search in any direction for other wheels. The left-most outer wheel is selected for the following explanation.

If the vehicle shape data is not available, the computer program executes as follows.

1. After shapes including circles and ellipses are detected, identify the left-most outer wheel in the image from the detected shape list.

2. Starting from the immediate right of the wheel, that is, the immediate right X value in the image Cartesian space, evaluate the detected shape list for the next wheel.

3. Continue searching for wheels by repeating step 2 to exhaustion.

4. Starting from the immediate left of the left-most outer wheel, identify the line(s) that is/are the left edge of the vehicle by searching the list for lines with smaller X values.

5. Starting from the immediate right of the right-most wheel, identify the line(s) that is/are the right edge of the vehicle by searching the list for lines with larger X values.

6. Starting from the bottom of the lowest identified wheel, that is, the lowest Y value in the image Cartesian space, identify the line(s) that is/are the bottom edge of the vehicle by searching the list for lines with smaller Y values.

7. Starting from the top of the highest identified wheel, that is, the highest Y value in the image Cartesian space, identify the line(s) that is/are the top edge of the vehicle by searching the list for lines with Smaller Y values.

If the vehicle shape data is available in the repository or database, the computer program executes as follows.

1. The vehicle shapes are scaled or transformed such that the wheels match the size of the detected wheels in the image and the vehicle shapes are aligned to the wheels. The program uses the coordinates of edges and features from the shape as a guide for finding corresponding edges and shapes in the image.

2. The computer program scans and identifies the bottom edge of the vehicle based on the wheel positions. The bottom edge is generally characterized as a line or edge that is parallel to the vehicle axis and is between, at a minimum, two of the axles. The computer program scans for all edges that can be between two axle positions. The computer program can use data in the database, if it is available, that indicates a distance or distance range of this bottom edge with respect to an axle position. The computer program can use this data to begin its search for the bottom edge. The computer program can use data in the database, if it is available, that describes the shape of the bottom between two axle positions. The program uses prior art techniques to find a best pattern match for the shape.

3. The program scans for and identifies the outermost bottom edge from each of the outermost axle positions to the front and back edges of the vehicle. The program can use data from the Reference Data database 535, if it is available, that indicates a distance or distance range of the bottom edge with respect to the outer axle position, a bottom shape, and a distance or range from the outer axle to the edge. If none of the data is provided, the program can use a starting position of the distance or range for other bottom edge detections that have been previously discovered.

4. If the vehicle does not have a bottom edge from the outermost axle positions to the front or back edge and there is not an indication otherwise from the database or user input, the program will initiate the search by using the adjacent bottom edge between the outermost axle position and its nearest neighbor as the starting distance from the outermost axle position to the bottom edge. The program will search for the outermost bottom edge from this starting position and using prior art detection techniques scan from the bottom position to the top of the wheel.

5. The program scans for and identifies the wheel wells using prior art detection techniques combined with the techniques of this invention. A wheel well is identified as an exterior part of the vehicle body that provides space for each of the wheels at each axle position and is usually curved around the position. The program can use data from the database, if available that includes any or all of the distance or range from the axel position for each axle and the shape of each well particular to that vehicle type. The most interesting wells are those associated with the outermost wheels. These are used to discover or further refine the outermost vehicle bottom boundaries and to further identify the vehicle front and back edges.

6. The program uses data from the reference data database 535, if available, that includes any or all of the distance or range to the top of the vehicle from one or more axle positions, the shape of the top if different from a straight line, and the proportion or ratio of the distance or range to the top from an axle position based on the axle spacing. The program identifies the top edge as the maximum distance from the axle line.

7. The program forms an initial bounding polygon within the vehicle image that is bounded by points including the maximum detected positions of the bottom of each wheel, the maximum top of the vehicle position, and either the outer edges of the outermost wheels or the outermost positions from the outermost bottom edges representing the front and back of the vehicle.

8. The computer program scans for and identifies the front and back edges of the vehicle. The program uses data from the database, if available, that includes any or all of the distance or range from the outermost axle positions to the front and back edges, the shape of the edge if different from a straight line, the proportion or ratio of the distance or range to the edges from the outermost axle positions, and the previously determined edges from the outermost bottom edge detection. The program obtains the vehicle orientation either from the user having previously designated it or the database indicating an orientation based on axle positions. If the orientation is not known, the program will use any or all of the available data to determine the front and back edges. After the edges are detected, the program adjusts the bounding polygon to the maximum edge positions, which are the maximum outward distance from each of the outermost axle positions.

The program searches and matches the vehicle shape data by two techniques:

1. Evaluating the image using the Generalized Hough Transform whereby a lookup table is constructed prior to any detections and evaluations. This lookup table describes the geometry of one or more features that contains coordinates, relationships among those coordinates, and may be combined with other shapes to describe the feature.

2. Evaluating the image using spatial position matching whereby a lookup table contains the data for the relative position of known features with respect to a known position such as the wheels for a specific vehicle type. One or more such feature positions can be included in the table and many tables can be created to represent different vehicle types. After detecting and identifying the wheels from the image, the number of wheels—the wheel count—is used to match one or many lookup tables. The size of the wheels and axle positions are used for further evaluation that may involve resealing one of the images prior to evaluating matches. After matched lookup tables are obtained, the coordinates for features are obtained and evaluated. A further evaluation can be performed such that at the feature coordinate, a corresponding subset of the image can be processed for more exact shape matching using the shape detection algorithms such as the Hough Transform.

The measurement calculator 550 can then use the recognized reference features and the stored dimensional data to calculate the length, width and height of the vehicle and finally, its total volume. This data can then be stored and/or passed on to another program for further processing such as a cargo loading program for loading a particular conveyance for carrying a plurality of the measured vehicles.

This has been a description of the preferred embodiments of the invention. The present invention is intended to encompass additional embodiments including modifications to the details described above which would nevertheless come within the scope of the following claims.

What is claimed is:

1. A computer program stored in a non-transitory medium from which the program can be executed by a computer, for determining a volume for a three-dimensional vehicle from at least two digitized images of the three-dimensional vehicle, the computer program further comprising:
   an image acquisition group of instructions for receiving at least two two-dimensional images of the three-dimensional vehicle in a computer-readable format, wherein a first image of the two-dimensional images is acquired in a first view and a second image of the two-dimensional images is acquired for a second view that is a depth or width view relative to the first view;
   a feature detector group of instructions that are executed to detect a shape and dimensions of features, including features that are smaller than the two-dimensional images of the vehicle;
   a reference detector group of instructions that are executed to determine dimensions between reference points detected in, or manually entered for, the two-dimensional images of the vehicle;
   a display group of instructions for displaying images of a vehicle on a visual display, including a display of symbols allowing manual entry of data representing at least one of: a vehicle model and dimensions for selected features of the vehicle; and
   a measurement calculator group of instructions that are executed to determine measurements about the three-dimensional vehicle in the image including a volume of the three-dimensional vehicle, from the dimensions of automatically detected features and from the data that has been manually entered into the computer.

2. The computer program of claim 1, wherein the vehicle is a wheeled vehicle; wherein said features include but not limited to wheels, front axle position and a rear axle position; wherein one reference is a distance between a front axle and a rear axle.

3. The computer program of claim 1, further comprising an adaptive learning group of instructions that determines a quality of results from executing the feature detector, reference detector and measurement calculator groups of instructions and causes these groups of instructions to be repeated one or more additional times to determine a statistical degree of certainty for identifying a particular three-dimensional object.

4. The computer program of claim 1, wherein the two-dimensional images are acquired from at least one of a digital camera, a video camera and a scanner.

5. The computer program of claim 4, wherein the two-dimensional images are acquired from image data in a non-visible spectrum.

6. The computer program of claim 1, wherein the two-dimensional images are acquired in at least one of a bit-mapped graphics format, a vector graphics format, a JPEG format or a PNG format.

7. The computer program of claim 1, wherein the vehicle is a wheeled vehicle; and wherein the feature detector group of instructions includes instructions for receiving the two-dimensional images from said image acquisition group of instructions and detects at least one vehicle feature in the image from a group of features consisting of wheels, wheel wells, axle positions, and vehicle bottom shape.

8. The computer program of claim 1, wherein the vehicle is a wheeled vehicle; and wherein the feature detector group of instructions includes instructions for comparing detected vehicle features with stored vehicle pattern data.

9. The computer program of claim 1, wherein said reference detector group of instructions includes instructions for receiving features that have been identified by the feature detector group of instructions, and also includes instructions for identifying spatial relationships between those features, and also includes instructions for identifying and associating reference data to with said relationships.

10. The computer program of claim 1, wherein said reference detector group of instructions includes instructions for identifying spatial relationships among features using stored relationship pattern data.

11. The computer program of claim 1, wherein said measurement calculator group of instructions identifies relationships between measurement points on the vehicle and calculates measurement distances using reference data provided by executing the reference detector group of instructions.

12. The computer program of claim 1, wherein the vehicle is a wheeled vehicle; and wherein said feature detector group of instructions are responsive to vehicle type data either stored in memory or input into the system to utilize vehicle type pattern data to detect features in the image.

13. The computer program of claim 1, further comprising a group of image correction instructions for correcting an image received through the image acquisition system before the image is evaluated.

14. The computer program of claim 13, wherein the group of image correction instructions is executed for correcting for barrel and pincushion distortions.

15. The computer program of claim 14, wherein the barrel and pincushion distortions are corrected in relation to stored digital lens parameters.

16. The computer program of claim 15, wherein said stored digital lens parameters are derived from a digital image of a Cartesian grid captured at different focal distances to the grid.

17. The computer program of claim 15, wherein said stored digital lens parameters are derived from a digital image of a measurement scale captured at different focal distances to the scale.

18. The computer program of claim 15, wherein said stored digital lens parameters are derived from a mathematical representation of lens distortion.

19. The computer program of claim 15, wherein said stored digital lens parameters are derived from lens distortion correction algorithms.

20. The computer program of claim 13, wherein the image is corrected for pixel aspect ratio distortion and perspective distortion in the digital image.

21. The computer program of claim 20, wherein the image corrector group of instructions utilizes two tables, corresponding directly to a plane of pixel positions of the image, and wherein each value in at least one of the two tables provides an index of a pixel position in the image and a corresponding value that is a displacement from said pixel position; and wherein a value is calculated using any function that originates in a center focus point of the image and changes with a parameterized function radially from the center focus point to edges of the image in a manner defined by the function.

22. The computer program of claim 20, wherein the image corrector group of instructions utilizes two tables, and wherein one of the two tables represents a correction of pixel position for one dimension of the image and the other of the two tables represents the pixel position correction for the other dimension.

23. The computer program of claim 20, wherein the image corrector group of instructions utilizes two tables, and wherein each table is indexed by x values for pixel position with respect to a coordinate system, and wherein y values corresponding to the x values in at least one of two tables represents an amount of correction for the pixel position.

24. A computer-implemented method for automatically determining a volume of a three-dimensional vehicle represented in at least two two-dimensional images, the method comprising:
  acquiring at least two two-dimensional digitized images of the vehicle in a computer-readable format, wherein a first image of the two-dimensional images is acquired in a side view and a second image of the two-dimensional images is acquired for a second view that is a depth or width view relative to the side view;
  analyzing the two-dimensional images in a computer, such that reference points on at least one of the two two-dimensional images are automatically identified;
  automatically determining distances between the reference points and component objects utilizing reference data provided for the three-dimensional vehicle;
  automatically identifying the vehicle by model based on a distance between the reference points on the vehicle and data stored in the computer;
  analyzing the two-dimensional images in the computer to automatically identify features in addition to outer boundaries of the vehicle in each two-dimensional view for use in calculating the volume of the vehicle; and
  calculating a volume for the vehicle in the computer based on the features automatically identified in each two-dimensional view.

25. The method of claim 24, further comprising comparing geometric patterns in the two-dimensional images that represent components within the images to geometric patterns stored in the computer to determine an identity of the components and an identity of the three-dimensional object.

26. The method of claim 24, wherein a digital image is received from an image acquisition subsystem and at least one vehicle feature in the image is identified from a group of vehicle features consisting of wheels, wheel wells, axle positions, and vehicle bottom shape.

27. The method of claim 24, wherein the three-dimensional object is a wheeled vehicle; wherein said geometric patterns include but are not limited to wheels, front axle position and a rear axle position; wherein one reference position is a distance between a front axle and a rear axle.

28. The method of claim 24, further comprising repeating the analyzing of the two-dimensional images to identify reference points, then comparing of geometric patterns in the two-dimensional images and the determining of distances between the reference points and the component objects utilizing reference data provided for the three-dimensional object; and then calculating a volume for the three-dimensional object to determine a statistical degree of certainty for identifying a particular three-dimensional object.

29. The method of claim 24, wherein a common reference measurement is located in the two two-dimensional digitized images to relate the images to one another and to allow calculation of a depth from one of the images.

30. Computer-implemented method for determining a volume of a three-dimensional vehicle represented in at least two two-dimensional images, the method comprising:
  acquiring at least two two-dimensional images of the vehicle in a computer-readable format, wherein a first one of the two-dimensional images is acquired in a plane transverse to a plane for a second one of the two-dimensional images;

analyzing the two-dimensional images in a computer, such that the computer automatically identifies reference points for dimensions of the vehicle which are to be determined;

comparing geometric patterns in the two-dimensional images that represent components within the images to stored geometric patterns to automatically detect an identity and dimensions of components less than outer boundaries of the vehicle;

manually inputting data into the computer to identify selected features, and corresponding dimensions to be determined for the selected features, to be and used in a calculation of volume for the vehicle; and determining dimensions for the three-dimensional vehicle in the computer from the features having manually input data and from data for the automatically detected components to determine a three-dimensional volume for the vehicle.

31. The method of claim 24, wherein the two-dimensional images are acquired in at least one of a bit-mapped graphics format, a vector graphics format, a JPEG format or a PNG format.

32. The method of claim 24, wherein data for features that are automatically detected from the two-dimensional images is stored in memory along with data which is manually input for other components.

33. The method of claim 30, wherein the two-dimensional images are acquired in at least one of a bit-mapped graphics format, a vector graphics format, a JPEG format or a PNG format.

34. The method of claim 30, wherein data for components that are automatically detected from the two-dimensional images is stored in memory along with data which is manually input for other components.

* * * * *